Figure 1:
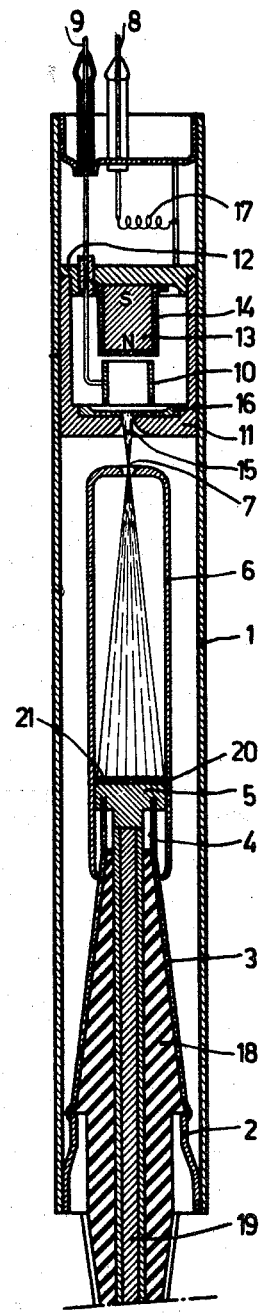

3,124,711
NEUTRON GENERATOR
Otto Reifenschweiler, Eindhoven, Netherlands, assignor to North American Philips Company, Inc., New York, N.Y., a corporation of Delaware
Filed May 4, 1960, Ser. No. 26,745
Claims priority, application Netherlands May 5, 1959
4 Claims. (Cl. 313—61)

The invention relates to neutron generators, in which deuterium and tritium ions in substantially equal atomic amounts are accelerated towards a target comprising a layer of a metal in which hydrogen is readily absorbed and into which it readily diffuses, the layer being supported by a metal in which hydrogen is neither readily absorbed nor does it readily diffuse thereinto.

Neutron generators of the above-mentioned type are known. The thickness of the zirconium layer on the target, which is subjected to bombardment by hydrogen isotopes, is about 50 microns. This great thickness has a limitation in that it takes a very long time before the bombardment by deuterium and tritium provides a saturation of the zirconium layer such that a useful neutron yield is obtained. In principle, the zirconium layer may be mounted in the tube after being saturated with tritium and deuterium. However, this has a limitation in that the neutron generator cannot be degassed at a sufficiently high temperature.

Furthermore, in the description of the above-mentioned neutron generator the wrong view is cherished that the penetration depth of the tritium in the zirconium layer does not exceed the range of the tritium ions. However, after capture the tritium diffuses further into the zirconium.

It is an object of the present invention to provide a construction having advantages over the known constructions.

In a neutron generator, in which deuterium and tritiums ions in substantially equal atomic amounts are accelerated towards a target comprising a layer of a metal in which hydrogen is readily absorbed and into which it readily diffuses, which layer is supported by another metal in which hydrogen is not readily absorbed and into which it does not readily diffuse, according to the invention the hydrogen-absorbing layer has a thickness which at the most is about equal to the range of the tritium and deuterium ions.

The construction in accordance with the invention provides the advantage that ions bombarded into the layer cannot disappear by diffusion into the depth of the material, so that in the shortest possible time a saturation of the target by tritium and deuterium and hence a maximum neutron yield are obtained. If the hydrogen-absorbing layer is slightly thinner than the range, the ions bombarded into the supporting layer will substantially diffuse back, so that saturation is rapidly reached. If the hydrogen-absorbing layer is hardly thicker than the range, saturation is reached after a longer period of time, which, however, is considerably shorter than in the known thick layers.

A neutron generator in accordance with the invention can be degassed at a high temperature before the bombardment of the target, so that contamination of the target is prevented as far as possible.

The thickness of the hydrogen-absorbing layer will slightly depend upon the ion acceleration voltage used in the operation of the neutron generator. Since, according to certain investigations, with an accelerating potential of 100 kv. in compact titanium the penetration range of deuterium ions is about 0.5 micron and of tritium ions 0.33 micron, while the range does not increase in linear relationship with velocity, a titanium layer having a thickness of a few microns is sufficient for accelerating potentials not exceeding 200 kv.

Instead of titanium use may be made, for example, of zirconium, while the supporting layer may be copper or silver.

Figure 2:
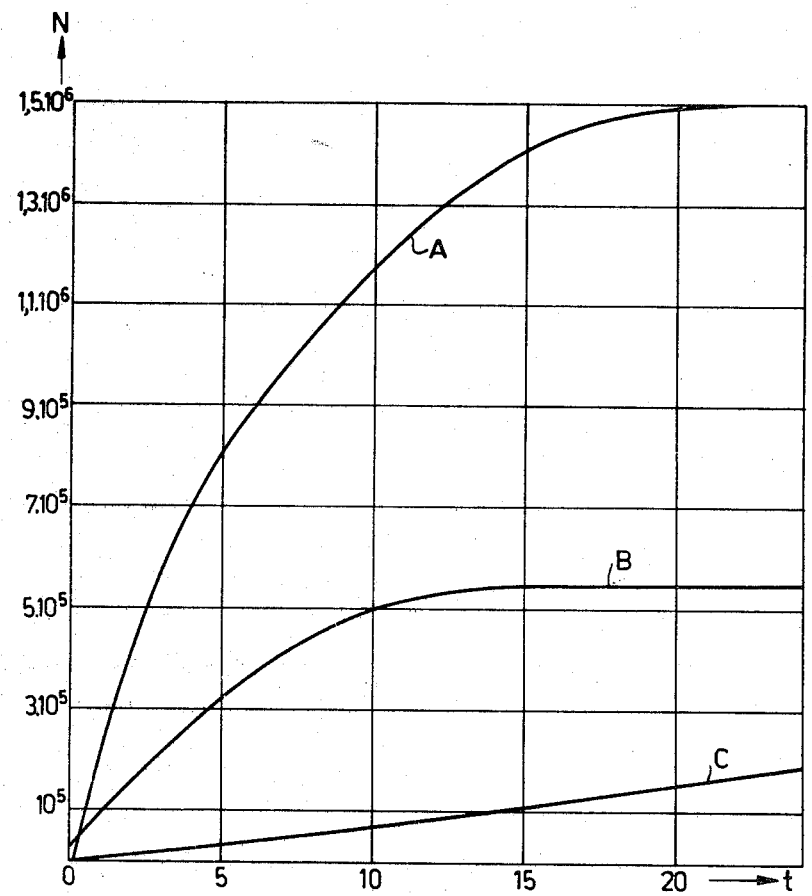

In order that the invention may readily be carried into effect, an embodiment will now be described, by way of example, with reference to the accompanying drawings, in which FIG. 1 shows a longitudinal section of a neutron generator having a target in accordance with the invention, and FIG. 2 is a graph showing the neutron yields of a few reference targets.

In FIG. 1, reference numeral 1 denotes a sheath of chromium nickel steel. With the aid of a fernico hood 2 a glass cone 3 is sealed in this sheath, which cone in turn is secured by sealing to a fernico annulus 4. The annulus 4 supports a copper block 5. To the copper block 5 is secured an elongated sleeve 6 of chromium nickel steel. The rounded upper end of the sleeve 6 has a small aperture 7. At the other end of the sheath 1, current supply wires 8 and 9 are introduced with the aid of fernico sleeves and glass caps. The wire 9 leads to a cylindrical anode 10 of aluminium which forms the accelerating means for the ions. In the sheath 1, provision is made of a sleeve 11 having a bottom 12, both being made of soft iron. On the bottom 12, a permanent magnetic block 13 covered by an aluminium plate 14 is provided. The bottom of the sleeve 11 is provided with an aperture 15 and coated with an aluminium layer 16. The supply wire 8 leads to a zirconium wire 17, which is wound helically and the other end of which is conductively connected via a stay wire to the wall.

Inside the glass cone 3, provision is made of a mass 18 of silicon rubber, through which the high-voltage supply wire 19 is passed. On the copper block 5 is provided a target 20 of silver, which is coated with a layer of titanium 21 having a thickness such that it corresponds to a layer of compact titanium of 1.5 microns in thickness. The entire vacuum space is filled with an equimolecular mixture of deuterium and tritium under a pressure of $10^{-3}$ mms. of mercury. An equimolecular amount of tritium and deuterium is also absorbed in the zirconium helix 17. The pressure in the vacuum space can be controlled by heating the helix 17.

After the tube has been degassed and sealed, the titanium layer on the target 20 is free from hydrogen isotopes. By bombarding the target with a beam of ions having a velocity of about 125 kv., the titanium layer is gradually saturated with tritium and deuterium so that reactions with the bombarding ions occur in which neutrons are produced having a velocity of 14 mev., saturation being reached after some time.

FIG. 2 is a graph showing the variation of the neutron yield N per microcoulomb in a tube of the kind shown in FIG. 1 as a function of the time $t$ in hours, when the target is bombarded by an ion current of 100 microamperes at 125 kv., a curve A showing the yield for a target coated with a titanium layer, while for the sake of comparison is shown the yield obtained with a target coated with a layer of gold, that is to say, a metal in which hydrogen is not readily absorbed and into which it does not readily diffuse (curve B).

The graph further shows a curve C which represents the neutron yield obtained, according to the literature, with a thick titanium layer in comparison to a gold layer. Comparison of the three curves shows that the restriction of the thickness of the titanium layer and the provision thereof on a layer which does not absorb hydrogen provides a material improvement.

What is claimed is:

1. A neutron generator comprising an envelope, a source of deuterium and tritium ions within said envelope, a target electrode within said envelope and spaced from said ion source, and means to accelerate deuterium and tritium ions toward said target, said target electrode having a first layer of a material which readily absorbs hydrogen isotopes and into which hydrogen isotopes are readily diffused, and a second layer of material relatively impermeable to hydrogen isotopes supporting said first layer, said first layer having a thickness equal to about the depth of penetration of tritium and deuterium ions thereinto.

2. A neutron generator comprising an envelope, a source of deuterium and tritium ions within said envelope, a target electrode within said envelope and spaced from said ion source, and means to accelerate deuterium and tritium ions toward said target, said target electrode having a first layer of a metal which readily absorbs hydrogen isotopes and into which hydrogen isotopes are readily diffused, and a second layer of metal relatively impermeable to hydrogen isotopes supporting said first layer, said first layer having a thickness not greater than about several microns and equal to the depth of penetration of tritium and deuterium ions thereinto.

3. A neutron generator comprising an envelope, a source of deuterium and tritium ions within said envelope, a target electrode within said envelope and spaced from said ion source, and means to accelerate deuterium and tritium ions toward said target, said target electrode having a first layer of a metal which readily absorbs hydrogen isotopes and into which hydrogen isotopes are readily diffused, and a second layer of metal selected from the group consisting of copper and silver supporting said first layer, said first layer having a thickness equal to about the depth of penetration of tritium and deuterium ions thereinto.

4. A neutron generator comprising an envelope, a source of deuterium and tritium ions within said envelope, a target electrode within said envelope and spaced from said ion source, and means to accelerate deuterium and tritium ions toward said target, said target electrode having a first layer of titanium and a second layer of metal selected from the group consisting of copper and silver supporting said first layer, said first layer having a thickness equal to about the depth of penetration of tritium and deuterium ions thereinto.

References Cited in the file of this patent

UNITED STATES PATENTS

| | | |
|---|---|---|
| 2,712,081 | Fearon | June 28, 1955 |
| 2,943,239 | Goodman | June 28, 1960 |
| 2,951,945 | Goodman | Sept. 6, 1960 |